United States Patent
Pelto-Huikko

(10) Patent No.: US 10,773,925 B2
(45) Date of Patent: Sep. 15, 2020

(54) BELT-TYPE TRACTION MEANS AND METHOD FOR FABRICATING THE TRACTION MEANS AS WELL AS USE OF SAID TRACTION MEANS IN AN ELEVATOR AND AN ELEVATOR PROVIDED WITH SAID TRACTION MEANS

(71) Applicant: Raimo Pelto-Huikko, Helsinki (FI)

(72) Inventor: Raimo Pelto-Huikko, Helsinki (FI)

(73) Assignee: Kone Corporation, Helsinki (FI)

( * ) Notice: Subject to any disclaimer, the term of this patent is extended or adjusted under 35 U.S.C. 154(b) by 182 days.

(21) Appl. No.: 15/933,597

(22) Filed: Mar. 23, 2018

(65) Prior Publication Data

US 2018/0208435 A1 Jul. 26, 2018

Related U.S. Application Data

(63) Continuation of application No. PCT/FI2016/050692, filed on Oct. 5, 2016.

(30) Foreign Application Priority Data

Oct. 20, 2015 (FI) ...................................... 20155746

(51) Int. Cl.
- *B66B 7/06* (2006.01)
- *D07B 5/00* (2006.01)

(Continued)

(52) U.S. Cl.
CPC ............. *B66B 7/062* (2013.01); *B29D 29/08* (2013.01); *D07B 5/006* (2015.07); *F16G 1/08* (2013.01);

(Continued)

(58) Field of Classification Search
CPC .. B66B 7/062; D07B 2501/2007; D07B 1/22; B29D 29/08; F16G 1/28

See application file for complete search history.

(56) References Cited

U.S. PATENT DOCUMENTS

| 3,033,050 A | 5/1962 | Hisserich |
| 2004/0216959 A1* | 11/2004 | Ach .......................... B66B 7/062 187/264 |
| 2015/0158702 A1* | 6/2015 | Dudde .................... B66B 7/062 187/255 |

FOREIGN PATENT DOCUMENTS

| DE | 4016812 A1 | 12/1990 |
| DE | 10201343 A1 | 7/2003 |

(Continued)

OTHER PUBLICATIONS

International Search Report PCT/ISA/210 for International Application No. PCT/FI2016/050692 dated Oct. 5, 2016.

(Continued)

*Primary Examiner* — Diem M Tran
(74) *Attorney, Agent, or Firm* — Harness, Dickey & Pierce, P.L.C.

(57) ABSTRACT

A belt-type traction apparatus includes a herringbone toothed belt, which includes two edge parts and a center part between the two edge parts in a transverse direction of the herringbone toothed belt and connecting the edge parts in the transverse direction. The two edge parts and the center part each extend in a longitudinal direction of the herringbone toothed belt. The center part is associated with a first spring constant, the two edge parts are each associated with a second spring constant, and the first spring constant smaller than the second spring constant. Each edge part includes a tooth part and a support structure supporting the tooth part. Each support structure includes a plurality of reinforcement members extending in the longitudinal direction of the toothed belt.

12 Claims, 3 Drawing Sheets

Figure 1:
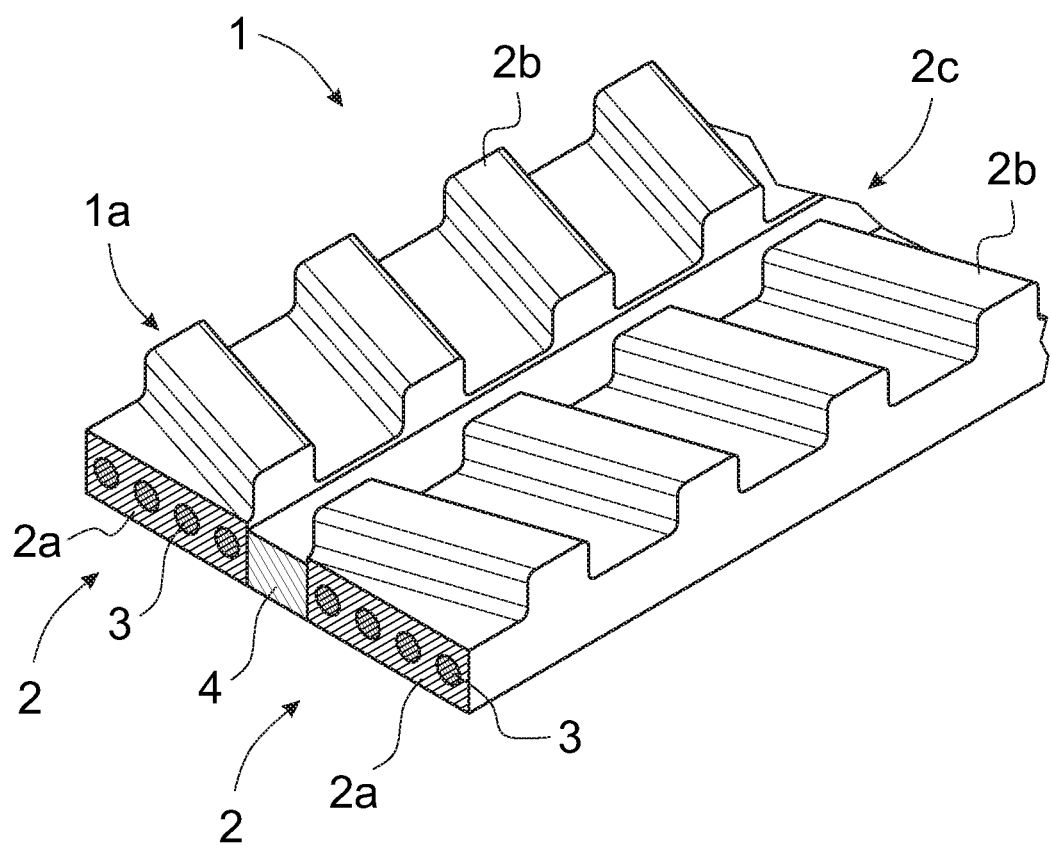

(51) Int. Cl.
    *F16G 1/12*          (2006.01)
    *B29D 29/08*       (2006.01)
    *F16G 1/08*          (2006.01)
    *F16G 1/28*          (2006.01)
    *D07B 1/22*          (2006.01)

(52) U.S. Cl.
    CPC ................. *F16G 1/12* (2013.01); *F16G 1/28* (2013.01); *D07B 1/22* (2013.01); *D07B 2501/2007* (2013.01)

(56) References Cited

FOREIGN PATENT DOCUMENTS

| | | |
|---|---|---|
| FR | 3017916 A1 | 8/2015 |
| WO | WO-03043927 A2 | 5/2003 |
| WO | WO-2013/041759 A1 | 3/2013 |
| WO | WO-2013/075751 A1 | 5/2013 |

OTHER PUBLICATIONS

Written Opinion of the International Searching Authority PCT/ISA/237 for International Application No. PCT/FI2016/050692 dated Oct. 5, 2016.
Finnish Search Report for Patent No. 20155746.

\* cited by examiner

BELT-TYPE TRACTION MEANS AND METHOD FOR FABRICATING THE TRACTION MEANS AS WELL AS USE OF SAID TRACTION MEANS IN AN ELEVATOR AND AN ELEVATOR PROVIDED WITH SAID TRACTION MEANS

This application is a continuation of PCT International Application No. PCT/FI2016/050692 which has an International filing date of Oct. 5, 2016, and which claims priority to Finnish patent application number 20155746 filed Oct. 20, 2015, the entire contents of both of which are incorporated herein by reference.

The object of the invention is a belt-type traction means and a method for fabricating the aforementioned traction means, as well as the use of the traction means in an elevator and an elevator provided with said traction means.

In solutions known in the art toothed belts are often used as transmission means, i.e. as traction means, for the rotating parts of machines and equipment, the belts having e.g. spur teeth, helical teeth inclined in one direction, or so-called herringbone teeth inclined in two opposite directions. When a belt wheel that is the drive wheel of a machine or device pulls a toothed belt, tooth forces of different magnitudes are exerted on the meshing teeth of the belt wheel at any given time. Distribution of the tooth forces is determined by the flexing of the longitudinal reinforcements, such as steel wires or corresponding means, inside the toothed belt in one interval between teeth. When, for example, the spring constant of the tooth of a gear wheel is approx. 5% of the spring constant of the belt reinforcements, the largest tooth force, which can be e.g. approx 20% of the corresponding belt force, is exerted on the first tractive tooth of the gear wheel at any given time. In this case the three first tractive teeth of the belt wheel bear almost one-half of the whole belt force. With softer gear wheel teeth the tooth force is certainly distributed to more teeth, but at the same time the deformation of the teeth with large loads increases and the teeth are overstressed.

Another problem with a belt, e.g. a herringbone toothed belt, that functions as a traction means and that is essentially wide with respect to its thickness is that the belt must adapt to the axial tolerances of the wheels rotated by the belt, because the shafts of the traction sheaves and of the diverting pulleys rotated by the belt are not always sufficiently precise in the direction of the plane of rotation of the belt. In this case the difference between the tension of the center part of a belt not adapted to these tolerances and the tension exerted on the edges of the belt becomes too large, and the belt wears out too quickly. A belt can be made to adapt better by making the belt flexible, e.g. by fitting tension means, such as metallic wires or braids suited to flexing, as the reinforcements of the belt, in which case the belt gives easily and flexes with regard to faults in the planes of rotation of the wheels. However in belt drives in which the lengths of the belt are long, such as e.g. in elevator use, in which a belt is used as a traction means, an easily elongating belt causes many problems and therefore elongations must be minimized. In this case reinforcements must be used that are more rigid than normal, but a problem arising in these cases is that the tooth shapes must be very precise and the alignment accuracy of traction sheaves and diverting pulleys must be extremely good, because otherwise the difference between the tension of the center part of the belt and the tension exerted on the edges becomes too large, which then wears the belt.

The aim of the present invention is to eliminate the aforementioned drawbacks and achieve an inexpensive and easy-to-implement belt-type herringbone traction means, which enables reduction of the tooth forces in the teeth of the drive wheel driving the traction means, in which case the teeth withstand much greater belt forces than currently. This, in turn, enables a reduction in the size of components associated with the use of drive wheels and of many other machines and devices, in which case costs, and often also layout problems, also decrease. Correspondingly, better endurance of the teeth forces of drive wheel teeth also enables, if necessary, the use of more efficient solutions.

Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each embodiment can also be applied in other embodiments. In addition it can be stated that at least some of the subordinate claims can, in at least some situations, be deemed to be inventive in their own right.

With the use of the traction means according to the invention, it is advantageous to implement elevator solutions in which the suspension ropes of the elevator car and of the counterweights or compensating weights are separated from the traction means. In this case the elevator machine is generally in the bottom part of the elevator hoistway, e.g. on the base of the elevator hoistway or close to it. This type of elevator solution provided with a traction means according to the invention is well suited to low-rise and medium-rise buildings and, owing to the smaller tooth force exerted by the traction means, even to elevators intended for extremely tall buildings. The traction means according to the invention is also suited to new elevators in low-rise buildings that previously had no elevator. In addition, the traction means according to the invention is well suited for use in the modernization of old elevators.

The traction means according to the invention preferably comprises a toothed belt having two edge parts side by side in the width direction and a center part between the edge parts connecting the edge parts, the spring constant of which center part in the transverse direction of the toothed belt is smaller than the corresponding spring constant of the edge parts. In this case the center part, being more flexible than the edge parts, allows slight widening of the toothed belt at the point of the meshing teeth and therefore more even distribution of the belt force to the teeth of the drive wheel driving the traction means.

One advantage, among others, of the solution according to the invention is that the belt force exerted on the teeth of a drive wheel driving a herringbone toothed belt is distributed, owing to the toothed belt flexing better in the lateral direction, more evenly to a number of consecutive meshing teeth of the driving gear wheel. In this case the teeth together withstand a much greater belt force than in solutions known in the art. This further enables the machines and all the components to be reduced in size without, however, losing the power needed. In this case costs are reduced and there is better control over space requirements. Correspondingly, the power being used can, if necessary, be increased without excessively endangering the endurance of the teeth of the drive wheel. Another advantage is also better endurance and less wear of the toothed belt. This increases the service life of the toothed belt and enables the use of long toothed belts without excessive internal tensions, arising from dimensional inaccuracies in the alignments of traction sheaves and diverting pulleys, being exerted on the belts. A herringbone toothed belt with better lateral flexibility than before also reduces the noise produced by tooth contact.

One advantage, among others, of the use of a traction means according to the invention is that it enables, among other things, a reliably operating elevator solution having the machine below, wherein the suspension means of the elevator car and of the counterweights or compensating weights and the traction means are separated from each other. Yet another advantage is that by means of the solution according to the invention the rope arrangements and layouts of elevators can be diversified, which enables easier layout design. Yet another advantage is faster and easier installation of an elevator, because the dimensional accuracy requirements for the alignments of the traction sheaves and diverting pulleys are lower. The solution according to the invention enables much smaller moving masses than in elevators according to prior art. In such a case a smaller acceleration force is needed, as a result of which a smaller machine, a lighter structure, smaller guide rails, et cetera, can be used. In addition, the diameter of the traction sheave functioning as the drive wheel can be approx. ¼ of the diameter of the traction sheave needed in solutions according to prior art. From this it follows that a sufficient torque of the machine is also only approx. ¼ of the torque needed in solutions according to prior art. In this case the efficiency ratio of the machine is appreciably better than prior art, because the speed of rotation is approx. four times faster. The aforementioned properties also reduce costs and, additionally, the solution according to the invention can be made to be space-efficient in the height, width direction and also depth direction of the elevator hoistway.

Figure 2:
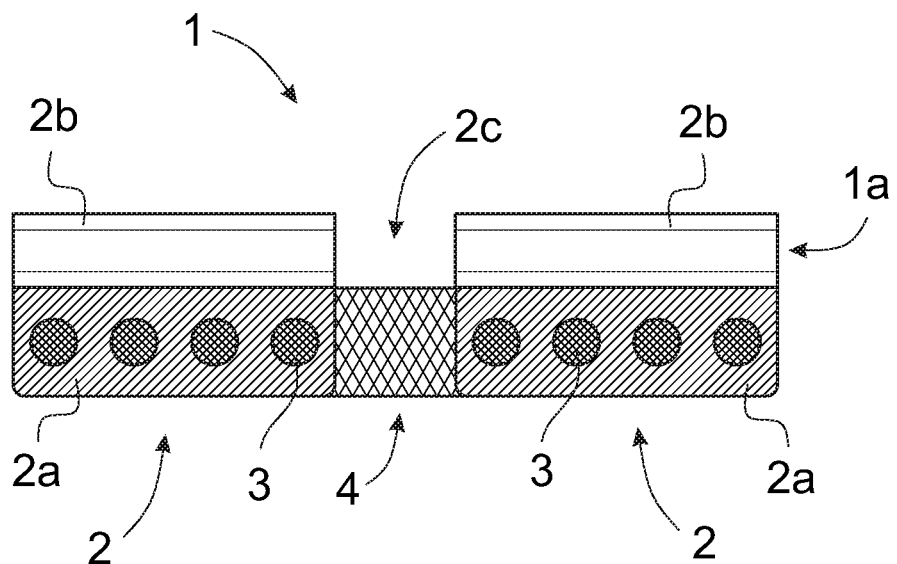
Figure 3:
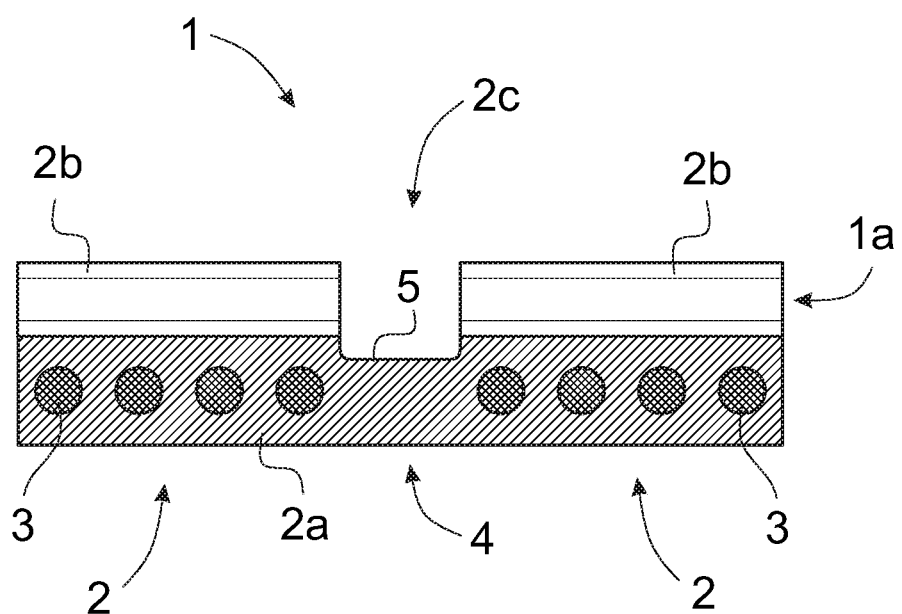
Figure 4:
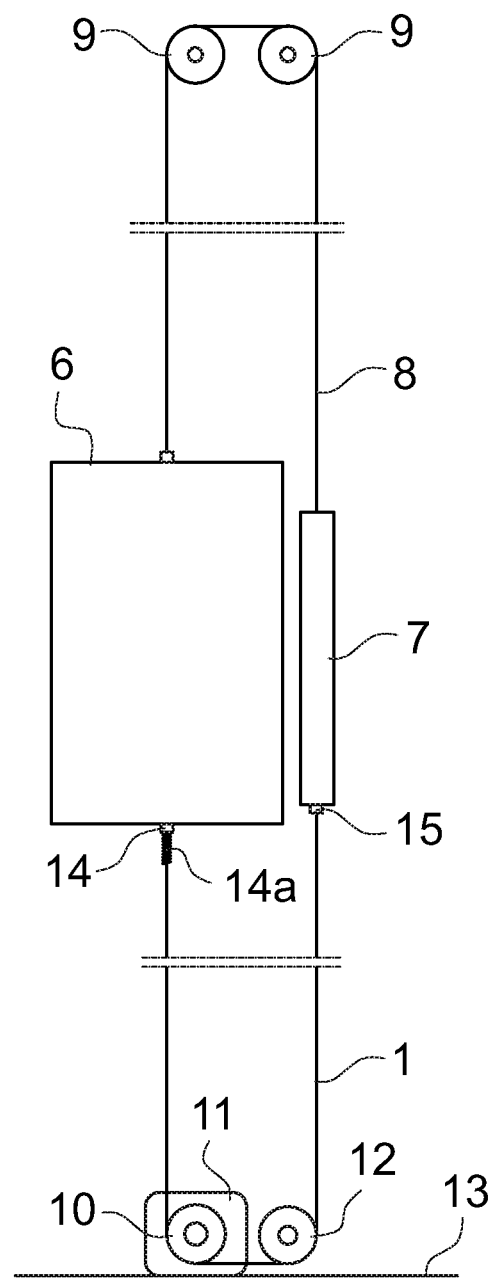

In the following, the invention will be described in more detail by the aid of some examples of its embodiment with reference to the simplified and diagrammatic drawings attached, wherein FIG. 1 presents an oblique view from the top and side of a short sectioned part of one traction means according to the invention, FIG. 2 presents an end view of another sectioned traction means according to the invention, FIG. 3 presents an end view of a third sectioned traction means according to the invention, and FIG. 4 presents a simplified and diagrammatic side view of one elevator arrangement, in which a traction means according to the invention is used and in which the hoisting machine of the elevator is disposed in the bottom part of the elevator hoistway.

FIGS. 1-3 present simplified and cross-sectioned views of various herringbone toothed belts, according to the invention, functioning as a traction means 1. What is common to all the different toothed belts 1 is that in the cross-section direction, i.e. in the width direction, of the toothed belt 1 the edge parts 2, with teeth 2b, of them is reinforced to withstand forces in the longitudinal and transverse directions of the toothed belt 1 whereas in the cross-section direction the toothless center part 4 in the center of the toothed belt 1 between the side edges 2 is arranged to flex more, at least in the transverse direction of the toothed belt 1, than the edge parts 2 of the toothed belt 1. In this case the spring constant of the center part 4 between the edge parts 2 and connecting the edge parts 2 is smaller in the transverse direction of the toothed belt 1 than the corresponding spring constant of the edge parts 2.

There are no teeth 2b at the point of the center part 4, so that in the cross-section at the point of the center part 4 is a groove 2c the length of the toothed belt 1, the depth of the groove being essentially the height of the teeth 2b or deeper. The teeth 2b on both edge parts 2 are similar to each other and as viewed from above they form an angle of the same magnitude as each other to the longitudinal centerline of the toothed belt 1 but on opposite sides of the longitudinal centerline.

FIG. 1 presents an oblique top view of a short part of one herringbone toothed belt 1 according to the invention, which is composed in cross-section of three parts side by side, i.e. a first edge part 2 and a second edge part 2 as well as a center part 4 between them in the center of the toothed belt 1 in the cross-section direction of the toothed belt 1, the center part being e.g. glued or otherwise fastened at its sides to the support structure 2a functioning as the back of the edge parts 2. In the structure according to FIG. 1 the thickness of the center part 4 is smaller than the thickness of the support structure 2a of the edge parts 2, in which case the flexing property of the center part 4 is enhanced.

Both edge parts 2 are composed of a support structure 2a, which is provided with teeth 2b that are at an inclined attitude with respect to the direction of travel of the toothed belt 1. Inside a support structure 2a is a plurality of load-bearing reinforcement means 3 side by side, such as metal wires or corresponding means in the longitudinal direction of the toothed belt 1. The reinforcement means 3 are side by side at regular intervals from each other in the support structure 2a and they are arranged in the longitudinal of the toothed belt 1 essentially on a plane in the direction of the plane of the support structure 2a of the toothed belt 1.

The support structure 2a of the edge parts 2 and the teeth 2b are of a strong and wear-resistant and essentially hard material, such as of an elastomer suited to the purpose. Correspondingly, the center part 4 is of a softer material than the support structure 2a of the edge parts 2, e.g. of some elastomer suited to the purpose, and is arranged to function as a transverse spring in the toothed belt 1, the spring having a spring constant smaller than the spring constant of the support structure 2a of the edge parts 2, and which in this case permits widening of the toothed belt 1 in its transverse direction at the point of meshing teeth 2b that are heavily loaded. In this case the belt force is distributed to a number of teeth 2b and the reinforcement means 3 inside the support structure 2a can stretch to be slightly longer without the tooth forces becoming excessive.

FIG. 2 presents an end view of a second sectioned toothed belt 1 according to the invention, the belt functioning as a traction means 1. This toothed belt 1 is otherwise similar to the toothed belt presented in FIG. 1, but in this structure the thickness of the center part 4, which is of a different material, is essentially the same as the thickness of the support structure 2a of the edge parts 2. In other respects this belt solution is, however, essentially similar in structure and in function as the belt solution according to FIG. 1.

FIG. 3 presents an end view of a third sectioned toothed belt 1 according to the invention, the belt functioning as a traction means. This toothed belt 1 is otherwise similar to the toothed belt presented in FIG. 1, but in this structure the center part 4 is the same material as the support structure 2a of the edge parts 2, which support structure in this solution is essentially width of the whole toothed belt 1. The center part 4 differs, however, from the edge parts 2 of the toothed belt 1 in that there are no reinforcement means 3 in the center part 4 and the thickness of the center part 4 is essentially smaller than the thickness of the support structure 2a in the edge parts 2 of the toothed belt 1, because in the center part 4 is a thinning groove 5 thinning the support structure 2a. The groove 2c between the teeth 2b in the center of the toothed belt 1 is in this solution now deeper by the amount of the depth of the thinning groove 5 and the base of the groove 2c extends to below the bottom plane of the teeth 2b inside the support structure 2a. The thinning groove 5 can be either on the front surface of the support structure 2a of the toothed belt 1, i.e. on the side of the teeth 2b, or on the rear surface of the support structure 2a of the toothed belt 1, i.e. on the opposite side to the teeth 2b. The thinner center part 4 without reinforcement means 3 now forms an area more flexible than the edge parts 2 in the lateral direction, i.e. in the width direction, of the toothed belt 1, the spring constant of which area in the width direction of the toothed belt 1 is smaller than the spring constant of the thicker edge parts 2.

The toothed belt 1 according to the invention is fabricated with the method according to the invention e.g. in such a way that in the cross-section an edge part 2 with support structure 2a and teeth 2b is disposed on each edge of the toothed belt 1 and also a center part 4 is formed between the edge parts 2 in the center of the toothed belt 1, the spring constant of which center part in the width direction of the toothed belt 1 is smaller than the corresponding spring constant of the edge parts 2, and which center part 4 is arranged to flex in the transverse direction of the toothed belt 1 more than the edge parts 2 of the toothed belt 1.

In the solutions according to FIGS. 1 and 2 the toothed belt 1 is fabricated in such a way that the center part 4, being essentially more flexible than the edge parts 2, being composed of a different material with respect to the edge parts 2 and having a spring constant smaller than the spring constant of the edge parts 2, is fastened at its sides to the side surfaces that are opposite each other of the support structures 2a of the edge parts 2 in between the support structures 2a. The fastening is done e.g. by gluing, vulcanizing or by some other method suited to fastening elastomers.

Correspondingly, in the solution according to FIG. 3 the toothed belt 1 is fabricated in such a way that a thinning groove 5 in the longitudinal direction of the toothed belt 1 is formed in the support structure 2a of the toothed belt 1 in the center of the toothed belt 1 in the cross-section of the toothed belt 1, at the point of which thinning groove the support structure 2a is thinner than at the point of the edge parts 2 of the toothed belt 1. The thinning groove 5 can be made either on the front surface of the support structure 2a of the toothed belt 1, i.e. on the side of the teeth 2b, or on the rear surface of the support structure 2a of the toothed belt 1, i.e. on the opposite side to the teeth 2b. If the thinning groove 5 is formed on the side of the teeth 2b, the groove 2c between the teeth 2b can be made in conjunction with forming it. The thinning groove 5 is formed either in conjunction with forming the profile of the toothed belt 1, e.g. by casting or otherwise molding, or later, e.g. by cutting or milling.

The size, strength properties, spring constants and materials of the center part 4 and edge parts 2 of the toothed belt 1 can be varied in many different ways for interadjustment of the transverse flexing of the center part 4 and edge parts 2 of the toothed belt 1.

FIG. 4 presents a simplified and partially sectioned side view of one elevator arrangement, in which is used a herringbone toothed belt, according to the invention, functioning as a traction means 1. Both the elevator car 6 and the compensating weight or counterweight 7, hereinafter for the sake of simplicity just compensating weight 7, are suspended with 1:1 suspension in such a way that the suspension ropes 8 of the elevator car 6 are led to travel from the elevator car 6 via the diverting pulleys 9 in the top part of the elevator hoistway to compensating weights 7 traveling on their own guide rails, to which compensating weights the second ends of the suspension ropes 8 are fastened.

In a solution using a traction means 1 according to the invention, the suspension and the moving of the elevator car 6 and the compensating weight 7 are separated from each other, in which case moving is implemented by means of a separate traction means 1, the first end of which traction means 1 is fixed to its fixing point 14 on the bottom part of the elevator car 6 and the second end to its fixing point 15 on the bottom part of the compensating weight 7. The traction means 1 is led from the fixing point 14 of its first end under the bottom of the herringbone traction sheave 10 of the elevator machine 11 that is in the bottom part of the elevator hoistway, e.g. on the floor 13 of the elevator hoistway, to the diverting pulley 12, and after passing around the bottom of which diverting pulley 12 the traction means 1 is led to the fixing point 15 of the second end on the bottom part of the compensating weight 7. The contact between the traction sheave and the traction means transmits the force moving the traction means to the traction means primarily via the toothing of the traction means. The traction means deflects on the traction sheave by the amount of the angle of contact between them. The elevator machine 11 can be geared or gearless.

In connection with the fixing point 14 of the first end of a traction means 1 is also a tensioning means 14a of the traction means 1, the purpose of which tensioning means is to keep the traction means 1 sufficiently taut from the viewpoint of operational functionality. The tensioning means 14a could just as well be only in connection with the fixing point 15 of the second end of the traction means 1 or also at both ends of the traction means 1.

The traction means 1 is in this elevator embodiment a herringbone toothed belt, which receives its kinetic energy from the traction sheave 10 by means of shape-locking. Additionally, the traction means 1 is structurally such that a center part 4 is in the center of the traction means 1 in the cross-section of the traction means 1, the center part being arranged to flex in the transverse direction, i.e. in the width direction, of the traction means 1 more than the edge parts 2 of the traction means 1, in which case the belt force acting in the traction means 1 is distributed more evenly on the herringbone toothing of the traction sheave 10.

The use of the traction means 1 according to the invention is not restricted solely to use of the elevator solution presented above, but instead the same traction means 1 can just as well be used in very different elevator solutions. Instead of one traction means 1 and the other components connected to it, there can be e.g. two side by side, and there can also be two compensating weights 7 side by side. In addition, the suspension ratio and traction ratio can also be other than 1:1, e.g. 2:1.

The elevator of FIG. 4 can also be realized in some other way, e.g. in such a way that the traction sheave is in the top part of the elevator hoistway instead of a diverting pulley.

FIG. 4 presents the traction sheave and the traction means in such a way that their angle of contact is 90 degrees. The elevator according to the invention can also be implemented using another contact angle. By arranging the mutual passage of the belt and the traction sheave otherwise, e.g. by means of a diverting pulley or diverting pulleys, an angle of contact of 180 degrees, or even more, can easily be achieved.

It must also be noted that the different solutions and features presented above can be inventive features together with one or more other features of the invention.

It is obvious to the person skilled in the art that the invention is not limited solely to the examples described above, but that it may be varied within the scope of the claims presented below. Thus, for example, the attitude and shape of a tooth can be different to what is presented above and the structure, shape, size, number, location and material of the reinforcement means in the support structure of the belt can be different to what is presented above. Thus, for example, the material of the reinforcement means, can instead of steel, be e.g. carbon fiber, glass fiber, Kevlar, an artificial substance, preferably Aramid, or combinations of one or more of the aforementioned, or some other metallic or non-metallic material suited to the purpose. The reinforcement means can be braiding, weave, fiber bundles, wire bundles, metallic or non-metallic tension rods or a composite structure receiving tension.

The invention claimed is:

1. A belt-type traction apparatus, comprising:
    a herringbone toothed belt, the herringbone toothed belt including
        two edge parts and a center part between the two edge parts in a transverse direction of the herringbone toothed belt and connecting the edge parts in the transverse direction, the two edge parts and the center part each extending in a longitudinal direction of the herringbone toothed belt, the center part associated with a first spring constant, the two edge parts each associated with a second spring constant, the first spring constant smaller than the second spring constant, each edge part including a tooth part and a support structure supporting the tooth part, each support structure including a plurality of reinforcement members extending in the longitudinal direction of the herringbone toothed belt,
    wherein
        the center part has a first material composition and the two edge parts each have a second material composition, the first material composition different than the second material composition, and
        the first material composition is both softer and more flexible than the second material composition.

2. The belt-type traction apparatus according to claim 1, wherein the center part has a thickness that is equal to or smaller than a thickness of each support structure of the two edge parts.

3. The belt-type traction apparatus according to claim 1, wherein
    the center part is fastened, at opposite sides of the center part, to separate, respective proximate side surfaces of the support structures of the two edge parts, and
    the center part is in a center of a cross-section of the herringbone toothed belt.

4. The belt-type traction apparatus according to claim 1, wherein the center part is configured to enable widening of the herringbone toothed belt at a point of meshing of the tooth parts of the two edge parts.

5. The belt-type traction apparatus according to claim 1, wherein the center part has a thickness that is smaller than a thickness of each support structure of the two edge parts.

6. The belt-type traction apparatus according to claim 1, wherein the center part has a thickness that is equal to a thickness of each support structure of the two edge parts.

7. A method for fabricating a belt-type traction apparatus, the method comprising:
    forming a center part between two edge parts such that the center part and the two edge parts extend in a longitudinal direction and the center part is between the two edge parts and is connected to each edge part of the two edge parts in a transverse direction, each edge part including a support structure and a plurality of reinforcement members extending in the longitudinal direction; and
    forming a plurality of tooth parts on the two edge parts to form a herringbone toothed belt, based on forming at least one tooth part on the support structure of each edge part of the two edge parts,
    wherein
        the center part has a different material composition than a material composition of the edge parts, and
        the forming the center part between the two edge parts includes fastening the center part, at opposite sides of the center part, to separate, respective proximate side surfaces of the support structures of the two edge parts.

8. The method according to claim 7, wherein the center part is fastened to the separate, respective proximate side surfaces of the support structures of the two edge parts based on gluing, welding, or vulcanizing.

9. The method according to claim 7, wherein the center part is configured to enable widening of the herringbone toothed belt at a point of meshing of the plurality of tooth parts.

10. An elevator, comprising:
    an elevator car;
    a compensating weight;
    a suspension rope coupling the elevator car and the compensating weight together; and
    a traction apparatus configured to move the elevator car and compensating weight, the traction apparatus including the herringbone toothed belt of claim 1.

11. An elevator, comprising:
    an elevator car in an elevator hoistway;
    an instance of drive machinery configured to induce movement of the elevator car in the elevator hoistway; and
    a herringbone toothed belt coupled to both the elevator car and the instance of drive machinery, the herringbone toothed belt configured to transmit rotational movement produced by the instance of drive machinery into movement of the elevator car, the herringbone toothed belt including
        two edge parts and a center part between the two edge parts in a transverse direction of the herringbone toothed belt and connecting the edge parts in the transverse direction, the two edge parts and the center part each extending in a longitudinal direction of the herringbone toothed belt, the center part associated with a first spring constant, the two edge parts each associated with a second spring constant, the first spring constant smaller than the second spring constant, each edge part including a tooth part and a support structure supporting the tooth part, each support structure including a plurality of reinforcement members extending in the longitudinal direction of the herringbone toothed belt, wherein
the center part has a first material composition and the two edge parts each have a second material composition, the first material composition different than the second material composition, and
the first material composition is both softer and more flexible than the second material composition.

12. The elevator according to claim 11, wherein the center part is configured to enable widening of the herringbone toothed belt at a point of meshing of the tooth parts of the two edge parts.

* * * * *